May 27, 1969     J. A. SWEENEY     3,446,314
CONVEYOR TROLLEY WHEEL LUBRICATOR
Filed Dec. 20, 1965
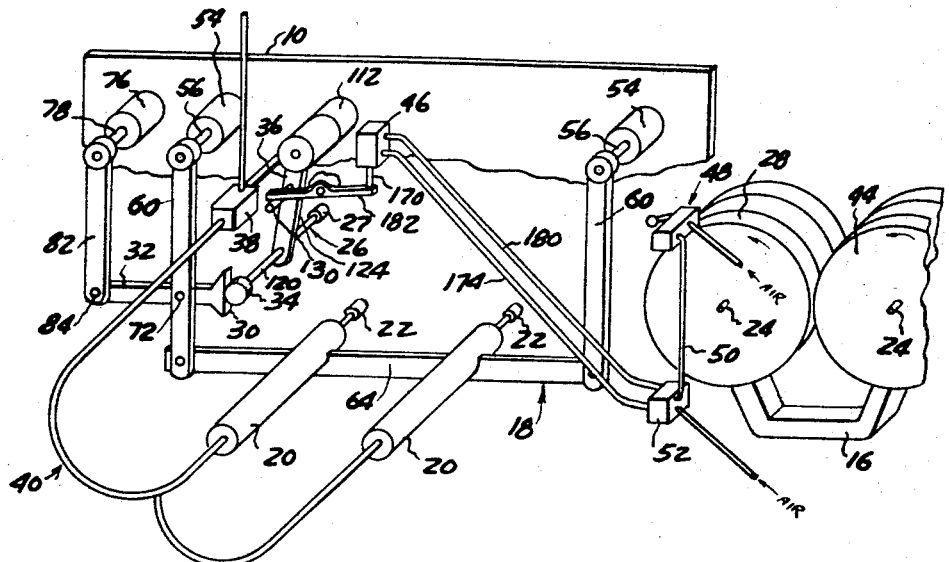
FIG. 1
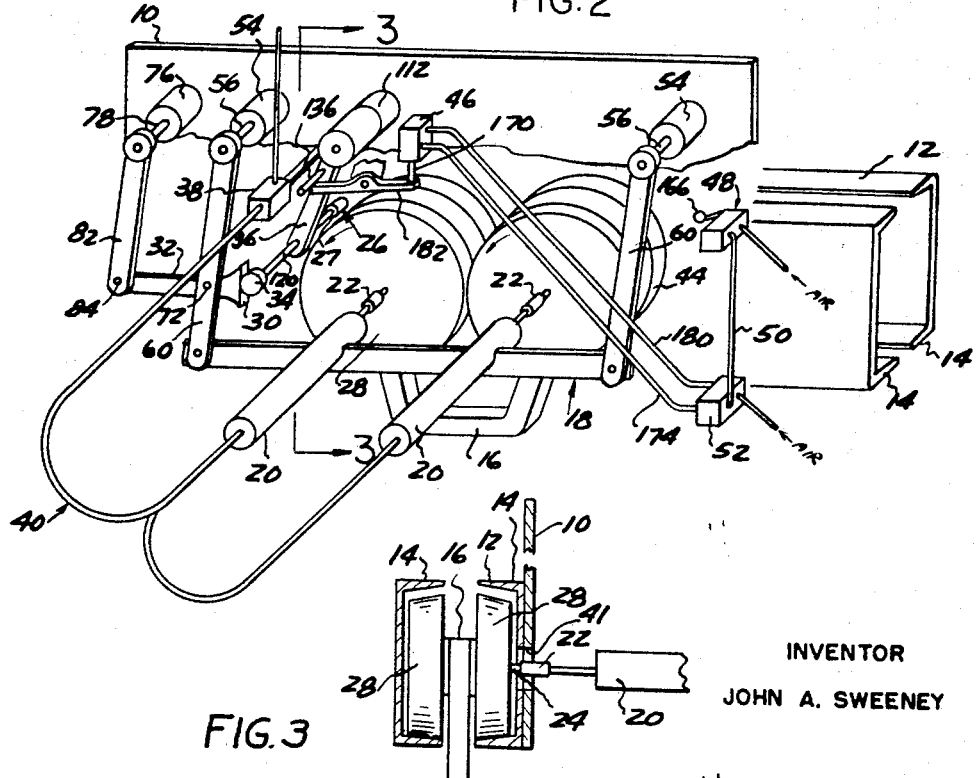
FIG. 2
FIG. 3
INVENTOR
JOHN A. SWEENEY
BY Hauke & Hauke
ATTORNEYS

INVENTOR
JOHN A. SWEENEY

BY Hawkes Hawke
ATTORNEYS

ABSTRACT OF THE DISCLOSURE

An automatic system to be mounted on an existing trolley wheel channel for lubricating high speed multiple bearing conveyors. The system includes a cradle which carries two or more lubricant guns and upon actuation by means responsive to the motion of the lead trolley wheel of the conveyor carrier assembly swings the lubricant guns into the lubricant fittings on the passing conveyor assembly.

---

The present invention relates to lubricating systems and more particularly to an automatic lubricator for an overhead trolley wheel conveyor system. Overhead conveyor systems are widely used in most modern industrial plants to carry parts that are going through various stages of finishing or assembly. For instance, in an automotive assembly plant, the body structure may be carried on an overhead conveyor through dip tanks containing primary paint, then after subsequent finishing operations, the body is carried through a high temperature bake oven and subsequently through further operations before being joined with the chassis.

Because of the various extreme operating conditions such as heavy loading, high temperature and dust to which many overhead conveyors are subjected, sealed type bearings will not give a reliable performance for an extended period of time. Therefore most conveyors of this type are adapted with lubricant fittings to which a lubricant is periodically supplied to the various bearings.

Because down time is costly, hand lubrication of the lubricant fittings is not economical. Therefore automatic lubricators have been developed that will deliver the lubricant while the conveyor system is in operation. Conventional automatic lubricators have been limited in two respects: First, they will not accomodate the latest higher speed conveyors. Secondly, such devices have been limited to single point lubrication, i.e., only one fitting was greased for each actuation of the system. The result is that many conveyor lubricant fittings have been inadequately lubricated, thus resulting in costly down time and repairs.

The present invention obviates the problems encountered in the past of lubricating high speed multiple bearing conveyors by providing an automatic lubricator system that can be mounted on the existing trolley wheel channel. The device comprises a cradle which carries two or more lubricant guns and upon actuation by means responsive to the motion of the lead trolley wheel of the conveyor carrier assembly the lubricant guns swing into position to deliver lubricant for a timed interval into the lubricant fittings on the passing conveyor assembly. The device reflects an improvement over prior lubricators in the following respects:

(1) The lubricator delivers lubricant to conveyor bearings moving at higher conveyor speeds than previous systems.

(2) The system can simultaneously deliver lubricant to a multiple number of fittings with a smaller minimum spacing between carrier wheels than could be handled by previous systems.

It is therefore an object of the present invention to provide an automatic trolley wheel lubrication device that will lubricate a high speed and high load overhead conveyor by providing an actuated lubricant gun carriage that by a simple cam type control responsive to the motion of the conveyor structure will move the lubricant guns in a spaced relationship to the conveyor bearings and then actuate the gun nozzles to lubricatingly engage with the bearings.

It is another object of the present invention to simultaneously lubricate a plurality of lubricant fittings on a high speed overhead conveyor having a plurality of carrier wheels by providing a roller member that lies in the path of the conveyor wheels but upon contact with the lead conveyor wheel actuates the lubrication and then remains out of the path of the conveyor structure for a timed interval so that a false signal is not received from a second or subsequent carrier wheel.

Still further objects and advantages will be made apparent in the following detailed description and drawings of a preferred embodiment of the invention in which—

FIG. 1 is a schematic view of the present invention showing the lead wheel of an approaching multi-wheel conveyor carrier actuating the timing means;

FIG. 2 is a schematic view of the lubricator showing the lead wheel of the moving conveyor carrier actuating the lubricant gun holder and with parts of the timing means cut away for clarity;

FIG. 3 is a view of a lead wheel of a conveyor carrier wheel in the process of lubrication as seen substantially from line 3—3 of FIG. 2;

Figure 4:
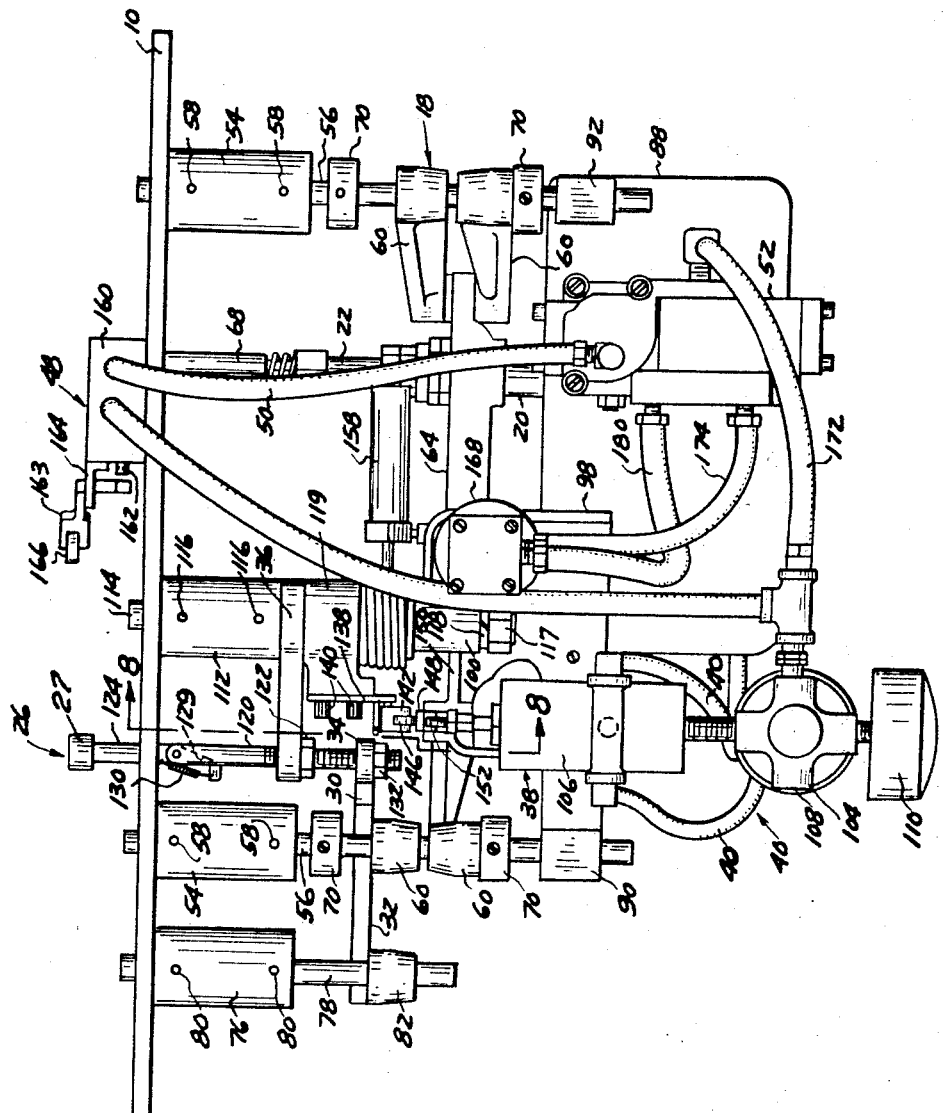
FIG. 4 is a plan view of the present invention.

Now referring to the drawings for a general description of the operation of the present invention, a preferred embodiment thereof is illustrated schematically in FIGS. 1–2, as comprising a vertical plate 10 fixed to the conveyor track 12 by any suitable means such as by welding, clamping, bolting or the like. As can best be seen in FIG. 3, the conveyor track 12 is shown for purposes of description as comprising a pair of channels 14 oppositely mounted so as to guide a wheeled conveyor carrier 16.

A lubricant gun holder generally indicated at 18 is movably mounted to the plate 10 and holds a pair of lubricant guns 20 having extendible nozzles 22. The nozzles 22 are mounted at substantially the same vertical level as the lubricant fittings 24 of the conveyor carrier 16 and are movable in a plane parallel to the fittings 24. An actuating member generally indicated at 26 is pivotally mounted to the plate 10 and supports a roller 27 disposed normally in the path of a lead wheel 28 of the moving conveyor carrier 16. As can be seen in FIG. 2, the roller 27 rides up over the moving lead wheel 28. A cammed member 30 having an arm 32 is pivotally mounted to the lubricant gun holder 18. As the roller 27 rides up over the moving conveyor wheel 28, it moves a roller 34 connected to the actuating member. The roller 34 comes into contact with the cammed member 30 and thereby moves the lubricant gun nozzles 22 at a spaced relationship to the conveyor lubricant fittings 24 by means which will become more apparent as the description proceeds. The actuating member 26 is also connected to a pivotal arm 36 which is adapted to actuate an air powered switch generally shown at 38. The switch 38 supplies compressed air by means of hose 40 to the lubricant guns 20 thereby extending the nozzles 22 into lubricating engagement with the conveyor lubricant fittings 24 for a timed interval. The plate 10 and channel 14 have a pair of slots 41 best seen in FIG. 3 to allow access to the fittings 24.

At the end of the drive stroke, the actuating roller 27 is retained out of the path of the second conveyor wheel 44 by means of a retaining mechanism generally shown at 46 and which will be described in greater detail below.

As can best be seen in FIG. 1, when the lead conveyor wheel 28 passes a compressed air signalling device 48, a signal is transmitted through a hose 50 to a timing device 52 which places the retaining mechanism 46 in a condition for retaining the roller 27 in a raised position for a predetermined period. The timing device 52 is adjusted to actuate the retaining mechanism 46 to release the actuating roller 27 after a period sufficient to allow the second conveyor wheel 44 to pass the normal in-path position of the actuating roller 27. It can be readily seen that the actuating roller 27 upon coming into contact with the lead conveyor roller 28 starts the lubricating sequence but remains out of the path of subsequent rollers on the same conveyor carrier until they have passed the lubricator.

Now referring to FIG. 4 for a detailed description of a preferred embodiment of the present invention, the lubricant gun holder 18 comprises a pair of bosses 54 having parallel bores (not shown) and are preferably welded to the plate 10. A pair of shafts 56 are received by the bosses 54 and are fixed in place at one end preferably by set screws 58. As can best be seen in FIG. 5, a pair of arms 60 are pivotally mounted to each of the shafts 56. Each pair of arms 60 is provided with a bore (not shown) adjacent the end opposite the shafts 56 which receives shaft 62. The arms 60 are spaced to accommodate a lubricant gun retaining arm 64 which is provided with a bore (not shown) which receives the shafts 62. Retaining rings 66 are provided at each end of the shafts 62 to prevent the shafts from working out of their respective bores.

Figure 5:
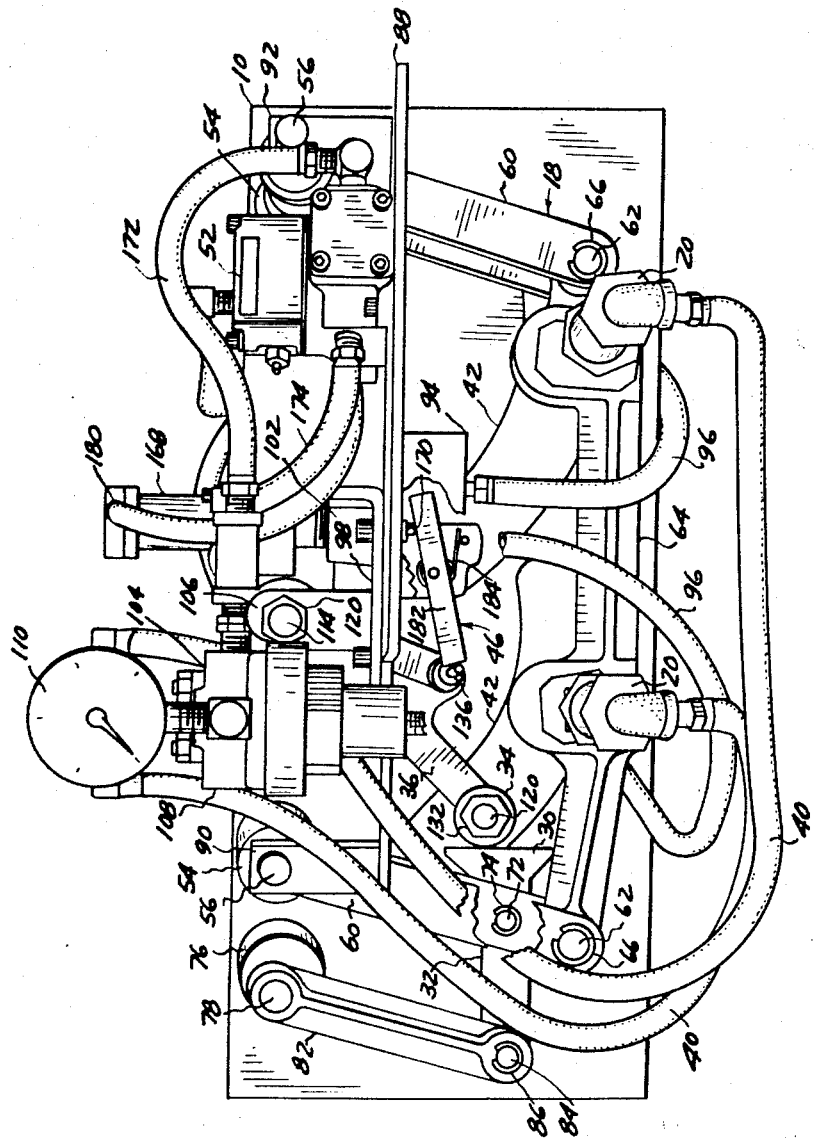
FIG. 5 is an elevational perspective view of the lubricator.

As can best be seen in FIG. 5, the lubricant gun retaining arm 64 is adapted to accommodate the air powered lubricant guns 20. The slidable nozzles 22 have flexibly mounted couplings 68 which engage the conveyor lubricant fittings 24 when the nozzles 22 are extended. As can best be seen in FIG. 4, the lubricant guns 20 are spaced with respect to the lubricant fittings 24 by means of a pair of set collars 70 fixed to the shafts 56.

As can best be seen in FIG. 5, the left inner arm 60 has a bore (not shown) intermediate its ends that receives a pin 72. The pin 72 receives a bore (not shown) in the cam arm 32. Each end of the pin 72 is provided with a retaining ring 74 so that the cam arm 32 is pivotally mounted to the arm 60. A boss 76 is fixed to the plate 10 preferably by welding, and is provided with a bore (not shown) which receives a shaft 78. One end of the shaft 78 is fixed to the boss 76 preferably by set screws 80. As can best be seen in FIG. 6, an arm 82 is pivotally fixed to the shaft 78. The arm 82 is pivotally connected to the cam arm 32 by means of a pin 84. The pin 84 is provided with a pair of retaining rings 86. It will readily be seen that a force applied to the cam 30 will move the lubricant gun holder 18. The shape of the cam 30 will be presently described.

Figure 6:
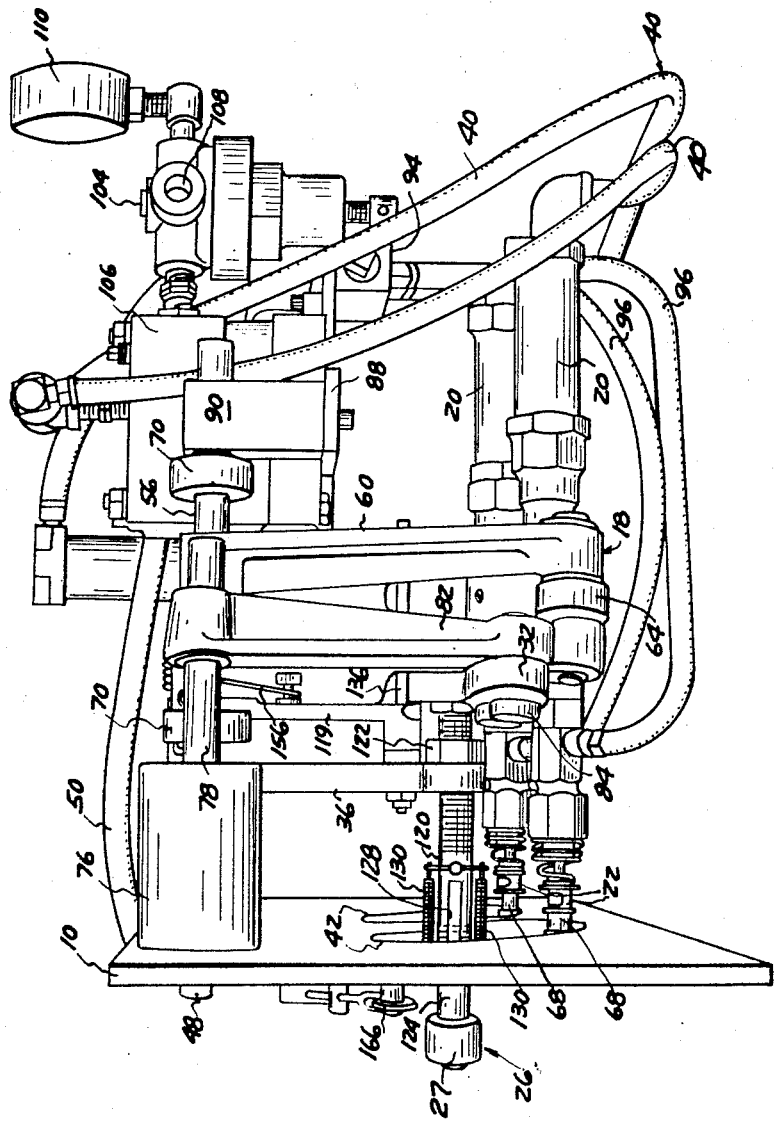
FIG. 6 is a perspective view of the device as seen substantially from the left side of FIG. 5.

Now referring to FIGS. 5 and 6, a mounting plate 88 is provided with a pair of bored projections 90 and 92 which receive the shafts 56 so that the plate 88 is suspended in a horizontal position. A lubricant valve 94 is fixed to the underside of the plate 88. Lubricant supplied from any conventional source is received by the valve 94 which directs the lubricant to the lubricant gun nozzles 22 by means of hoses 96.

A plate 98 is mounted on the plate 88 and is provided with a bored projection 100 and a boss 102 as can be seen in FIGS. 4 and 5. As can best be seen in FIGS. 5 and 6, air valve 104 and plunger actuated air valve 106 are mounted to the plate 98. Compressed air from any conventional source (not shown) is received by a port 108 provided in the air valve 104. A conventional type air gauge 110 is attached to the valve 104 and indicates that air is being received from the source. The compressed air is directed from the air valve 104 to plunger actuated air valve 106. When the air valve 106 its actuated by means presently to be described, air is directed to the lubricant guns 20 by means of the hose 40.

As can best be sen in FIG. 4, a boss 112 is welded intermediate the bosses 54 and fixed to the plate 10. A shaft 114 is received by the boss 112 and is secured thereto preferably by set screws 116. The opposite end of the shaft 114 is externally threaded and is received and extends through the bored projection 100 on the plate 98. A lock washer 118 and nut 117 fasten the shaft 114 to the projection 100. The arm 36 and a bossed actuating member 119 are pivotally mounted to the shaft 114. Still referring to FIG. 4, it can be seen that the arm 36 carries a threaded rod 120. The rod 120 is secured at an intermediate position to the arm 36 by the nut 122. A rod 124 carrying the roller 27 is pinned to the rod 120. The rod is adjusted so that the roller 27 extends into the path of the moving conveyor wheel 28. The rod 120 is provided with an axial slot 128 which is adapted to receive the end of the rod 124. The internal surface 129 forming the end of the slot 128 is inclined as shown in FIG. 4 to allow the rod 124 to pivot out of the path of a conveyor wheel traveling backwards. Springs 130 maintain the rod 124 in a normally extended position.

When the roller 27 rides up and over the lead conveyor wheel 28, it moves the roller 34 which is carried on the rod 120 into rolling contact with the cam 30. The roller 34 is secured to the threaded rod 120 by the nut 132. The roller 34 engaging the cam 30 moves the lubricant gun holder 18 as the roller 27 is actuated by the lead conveyor roller. However since the conveyor wheels 28 and 44 are moving in a linear direction and the lubricant gun nozzles 22 are moving in an arc determined by the geometry of the holder 18, the contour of the cam 30 is shaped so that the nozzles 22 are traveling at substantially the same rate of speed as the conveyor wheel fittings 24.

Figure 8:
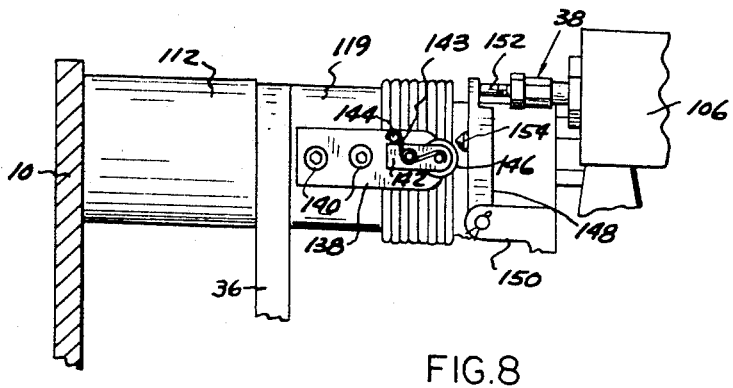
FIG. 8 is a view of the lubricant gun actuating mechanism as seen substantially from line 8—8 of FIG. 4.

Now referring to FIG. 6, the arm 36 and the arm 119 are bored to receive a finger 136 so that movement of arm 36 carries the arm 119. Now referring to FIG. 8, a plate 138 is fixed to the arm 119 preferably by screws 140. A clevis 142 is pivotally pinned to the plate 138. A spring 143 is adapted to normally urge the clevis 142 against a stop 144 fixed to the plate 138. A roller member 146 is pinned to the clevis 142.

A lever member 148 is pivotally pinned to the projection 150 fixed to the plate 88 and is adapted to contact a slidable actuating plunger 152 extending from the air valve 106. When the arm 119 is moved by the arm 36, the roller 146 comes into contact against a pointed projection 154 on the lever 148 thereby actuating the air valve 106 to supply air to activate the lubricant gun nozzles 22. When the roller 146 has passed the projection 154, the plunger 152 returns to its normally extended position thereby deactivating the lubricant gun nozzles 22. When the arm 119 returns on the return stroke, the roller 146 comes into contact with the projection 154 which causes the clevis 142 to pivot the roller 146 over the projection 154 so that the air valve 106 is not activated on the return stroke.

As can best be seen in FIGS. 4 and 6, a spring 156 is disposed around the shaft 114 and fixed to the arm 119 and to a dash pot 158. The dash pot 158 is pivotally pinned to the plate 98 and is adapted to cushion the return stroke of the lever arm 36 which is carried by the weight of the holder 18 to its normal downward position at a timed interval after the conveyor wheels 28 and 44 have been lubricated.

Figure 7:
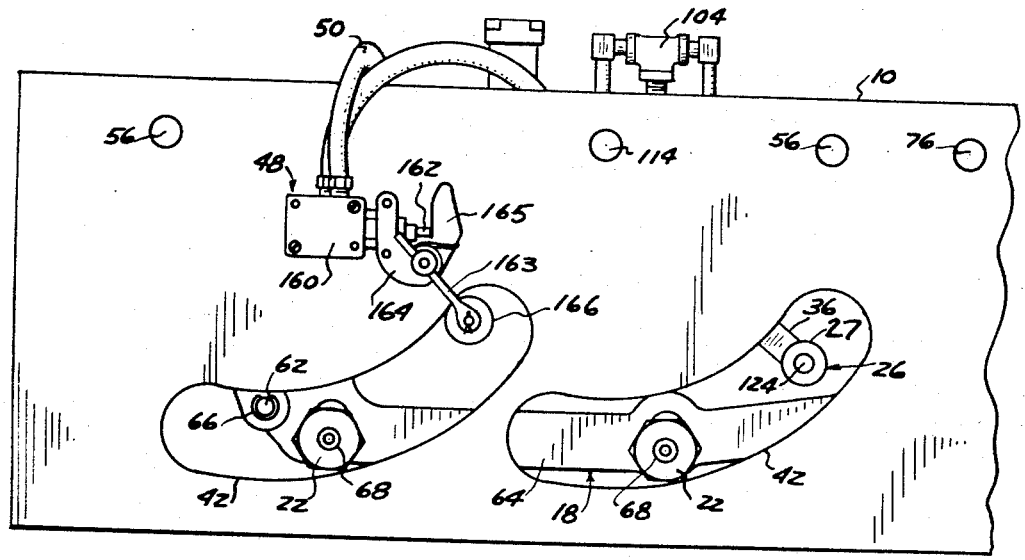
FIG. 7 is a view of the present invention as seen substantially from the top of FIG. 4.

Now referring to FIG. 7, the signalling means 48 is disposed adjacent the path of the moving conveyor wheels 28 and 44 and comprises a plunger activated air valve 160 having a plunger 162. A clevis 163 and an actuating finger 165 are fixed to each other and are pivotally pinned to a bracket 164 which is fixed to the air valve 160. A roller 166 is pinned to the clevis 163 and is adapted to normally lie in the path of the lead conveyor wheel 28. The conveyor wheel 28 engages the roller 166 to pivot the finger 165 into engagement with the plunger 162 and to thereby activate the air valve 160.

Now referring to FIGS. 4 and 5, the air operated timer 52 is mounted to the plate 88 and an air actuated plunger 168 is mounted to the boss 102 on the plate 98. The plunger 168 is provided with a rod 170 which moves between an extended and a retracted position. The rod 170 is normally in the extended position. Air pressure is normally directed from the valve 104 to the timer 52 by a hose 172.

A hose 174 directs the air from the timer to the plunger 168 to keep the rod 170 in the extended position. Air is directed from the valve 104 to the signalling air valve 160 which when actuated by a conveyor wheel 28 actuates the timer 52 by directing air through hose 50. The timer 52 upon actuation directs air through the hose 180 to thereby cause the plunger 168 to retract the rod 170 for a predetermined time interval.

Now referring to FIG. 5 a lever 182 is pivotally pinned to the plate 98. A spring 184 biases the lever 182 against the plunger rod 170. The lever 182 is adapted so that when the rod 170 is retracted while the arm 36 is in the engaged position, the lever engages the finger 136 and prevents the actuating roller 27 from returning to its normal position in the path of the conveyor wheel 28. When the plunger 168 is activated by the timer 52, the rod 170 moves the lever 182 out of the path of the finger 136 thereby allowing the associated members to return to their normal position. It can be readily seen that the timer can be set for a sufficient time to allow the second conveyor wheel to pass the activating position of the actuating roller 27, thereby preventing a false signal to actuate the lubricator device.

It is to be understood that the foregoing description of a dual lubricant gun device is for descriptive purposes only. The present invention can be modified to incorporate a plurality of guns on both sides of the conveyor tract that will simultaneously lubricate the wheel bearings and other bearings associated with the moving conveyor structure. In addition, the lubricator need not necessarily be actuated by the lead conveyor wheel, but may be actuated by any moving part on the convenyor carrier. It can also be readily seen that other sensing means could be used to detect the presence of the moving conveyor carrier to signal the timing device such as a light beam.

It will readily be seen that I have described a lubricating device that is actuated by a moving member of a conveyor structure, preferably a lead wheel. The conveyor wheel actuates the lubricant nozzles to travel at a spaced distance from the conveyor bearings. After a determined distance, the lubricant guns engage the bearing fittings in a lubricating fashion. The actuating roller then remains out of the path of subsequent conveyor wheels on the conveyor carrier so that a false signal is not given to the lubricator. After a timed interval, the actuating roller is then returned to its normal position in the path of the next conveyor carrier.

It is to be understood from the foregoing description that various changes and modifications may be made without departing from the spirit of the invention as expressed by the scope of the appended claims.

I claim:
1. A conveyor lubricator for lubricating a bearing carried by a conveyor structure moving on a generally linear track as said conveyor structure is moving in a generally horizontal direction, comprising:
    (a) frame means mounted adjacent said track,
    (b) a lubricant gun holder adapted to support a lubricant gun,
    (c) a lubricant gun having an extendible nozzle mounted on said lubricant gun holder and means for extending the nozzle of said gun in a generally horizontal direction and in a direction substantially perpendicular to the direction of movement of said conveyor structure into lubricating engagement with the bearing on said conveyor structure when said nozzle is generally aligned with said bearing;
    (d) means pivotally mounting said lubricant gun holder on said frame so that said gun holder pivots about a pair of generally horizontal axes extending substantially normal to the direction of movement of said conveyor and so that said lubricant gun is movable from a first position to a second position in a plane substantially parallel to the motion of the bearing;
    (e) an actuating member;
    (f) means for mounting said actuating member on said frame for motion between a pair of spaced positions in the path of movement of said conveyor structure so that said member is moved between said positions by said conveyor structure when the bearing is in general alignment with the nozzle of the lubricant gun;
    (g) means connecting said actuating member and said lubricant gun holder for coacting motion as said actuating member is moved between said pair of spaced positions to move the nozzle of said gun through an arc in the direction of motion of the bearing and at a velocity generally corresponding to the rate of linear travel of said bearing.

2. A conveyor lubricator as defined in claim 1, wherein the means for mounting said actuating member includes an arm pivotally mounted on said frame and means for mounting said actuating member on said arm for motion between raised and lowered positions in the path of the moving conveyor structure, said lower position being disposed in the path of a conveyor wheel so that said actuating member rides up over the conveyor wheel as the conveyor structure travels past said lubricant gun.

3. A conveyor lubricator as defined in claim 2 wherein said last mentioned means comprises structure having a cammed surface carried by said lubricant gun holder, and a follower carried by said arm and engaged with said cammed surface so that the motion of said arm produced by said actuating moving from its lowered to its raised position causes said lubricant gun holder to swing from its first position to its second position at a predetermined rate.

4. A conveyor lubricator as defined in claim 3, including means for retaining the actuating member in its raised position a predetermined time and means for sensing the lead wheel of the conveyor structure approaching said lubricant gun for actuating said retaining means.

5. A conveyor lubricant as recited in claim 1, wherein the lubricant gun nozzles have flexibly mounted couplings for engaging the conveyor bearing lubricant fittings.

6. A conveyor lubricator for simultaneously lubricating a plurality of bearings carried by a conveyor structure moving on a generally linear track as said conveyor structure is moving in a generally horizontal direction, comprising:
    (a) frame means fixedly mounted adjacent said track,
    (b) a lubricant gun holder comprising:
        (1) a pair of support arms,
        (2) means pivotally mounting one end of each of said support arms on said frame for motion about a pair of spaced, generally horizontal axes extending at right angles to the motion of said conveyor structure on said track,
        (3) a retaining arm pivotally connecting the opposite end of said support arms, so that said retaining arm is movable between first and second positions in an arc adjacent the axis of motion of said bearings along said track;
    (c) a plurality of lubricant guns mounted on said retaining arm, each of said lubricant guns having an extendable nozzle adapted for generally horizontal movement toward and away and at substantially a 90° angle with respect to the path of motion of the bearings of said conveyor structure;
(d) an actuating roller movably mounted on said frame means for motion between a pair of spaced positions, one of said positions being in the path of said conveyor structure;
(e) means for simultaneously moving said extendible nozzles into lubricating engagement with said bearings when said nozzles are in general alignment with said bearings, and
(f) motion transmitting means connecting said actuating roller and said lubricant gun holder for co-acting motion when said nozzles are adjacent said bearings when said actuating roller is moved by contact with the conveyor structure between said pair of spaced positions.

7. A conveyor lubricator for lubricating a bearing carried by a conveyor or structure moving on a generally linear track, comprising:
(a) frame means mounted adjacent said track,
(b) a lubricant gun holder adapted to support a lubricant gun,
(c) a lubricant gun having an extendible nozzle mounted on said lubricant gun holder and means for extending the nozzle of said gun into lubricating engagement with the bearing on said conveyor structure when said nozzle is generally aligned with said bearing,
(d) means pivotally mounting said lubricant gun holder on said frame so that said lubricant gun is movable from a first position to a second position in a plane substantially parallel to the motion of the bearing,
(e) an actuating roller and means for mounting said roller on said frame for motion between a lower position and an upper position by rolling contact with a lead wheel of the moving conveyor structure so that said roller is moved between said positions by said conveyor structure when the bearing is in general alignment with the nozzle of the lubricant gun,
(f) cam and follower means connecting said actuating roller and said lubricant gun holder for co-acting motion as said actuating roller moves between said positions so that the nozzle of said gun travels through an arc in the direction of motion of the bearing and at a velocity generally corresponding to the rate of linear travel of said bearing, and
(g) means for controlling the return of said actuating roller from the upper position to the lower position comprising means for releasably retaining the actuating roller in the upper position, signaling means disposed in the path of the moving conveyor structure and actuated by contact with said moving conveyor structure; and timing means operable after a predetermined time from the receipt of a signal from said signaling means to actuate the retaining means to release the actuating roller from its upper position so that it can return to its lower position lying in the path of the moving conveyor structure.

References Cited

UNITED STATES PATENTS

| | | | |
|---|---|---|---|
| 1,160,067 | 11/1915 | Goyn | 184—2 |
| 2,624,423 | 1/1953 | Moore. | |
| 2,696,277 | 12/1954 | Schweisthal et al. | |
| 3,156,320 | 11/1964 | Bystricky et al. | |
| 3,205,973 | 9/1965 | Klatchko | 184—15 X |

FOREIGN PATENTS 549,155  11/1942  Great Britain.

LAVERNE D. GEIGER, Primary Examiner.

E. J. EARLS, Assistant Examiner.